United States Patent
Corvalan

(10) Patent No.: US 7,415,906 B2
(45) Date of Patent: Aug. 26, 2008

(54) MANUALLY ACTUATED POSITIONING DEVICE WITH HIGH RESOLUTION AND LARGE RANGE OF MOTION

(76) Inventor: Victor Corvalan, 23047 Cricket Hill Rd., Cupertino, CA (US) 95014

( * ) Notice: Subject to any disclaimer, the term of this patent is extended or adjusted under 35 U.S.C. 154(b) by 365 days.

(21) Appl. No.: 10/736,667

(22) Filed: Dec. 17, 2003

(65) Prior Publication Data

US 2004/0123689 A1 Jul. 1, 2004

Related U.S. Application Data

(60) Provisional application No. 60/434,301, filed on Dec. 17, 2002.

(51) Int. Cl.
*F16H 1/18* (2006.01)
(52) U.S. Cl. .................... 74/424.78; 74/424.79
(58) Field of Classification Search ............. 74/424.78, 74/424.79
See application file for complete search history.

(56) References Cited

U.S. PATENT DOCUMENTS

| | | | | | |
|---|---|---|---|---|---|
| 2,491,543 | A | * | 12/1949 | Alfonso | 74/424.78 |
| 3,817,111 | A | * | 6/1974 | Allen | 74/156 |
| 3,842,690 | A | * | 10/1974 | Gulick | 74/625 |
| 4,147,073 | A | * | 4/1979 | Mercier | 74/424.78 |
| 5,195,390 | A | * | 3/1993 | Nogaki | 74/424.75 |
| 5,713,242 | A | * | 2/1998 | Kanner et al. | 74/424.78 |

* cited by examiner

*Primary Examiner*—David M Fenstermacher

(57) ABSTRACT

A linear stage having a screw-nut assembly is actuated by the rotational motion of the screw. A mechanism, which is an integral part of the nut, quickly disconnects the screw and the nut, allowing rapid positioning of the linear stage in both the forward and reverse direction. The motion of said stage has a resolution given by the thread pitch of the screw and the nut; and a travel only limited by the length of the screw. The quick disconnect screw-nut assembly mechanism described in this invention is achieved by axial preloading said nut and allowing said nut to pivot perpendicular to the axis of said screw. Two or more linear stages having said screw-nut assembly are concatenated with one another to form a multi-axis positioning device.

9 Claims, 3 Drawing Sheets

MANUALLY ACTUATED POSITIONING DEVICE WITH HIGH RESOLUTION AND LARGE RANGE OF MOTION

CROSS-REFERENCE TO RELATED APPLICATIONS

Provisional Patent Application No.: 60/434,301 filed on Dec. 17, 2002.

STATEMENT REGARDING FEDERALY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to (i) positioning devices and more particularly to manually actuated linear stages; and to (ii) anti-backlash screw-nut assembly mechanisms generally used in positioning devices.

2. Description of the Relevant Art

In a linear stage two plates slide parallel and opposite to one another. If a screw and nut assembly connects the two plates of said linear stage, the rotation of the screw generates a rectilinear motion. There is always a tradeoff between the resolution and the total travel of a linear stage, particularly when it is manually operated. For instance, for a screw with a thread pitch of 0.050 inches (1.27 mm), as in a ¼"-20 ACME thread lead-screw, a 5 degree rotation translates into a linear motion of approximately 0.0007 inches (0.0176 mm or 17.6 microns). Using the same lead-screw, it takes 200 full turns or revolutions to move the stage 10 inches (254 mm). This is inconvenient when high resolution and fast motion are required in manually operated single or multi axis positioning devices. However, this limitation can be overcome by temporally disconnecting the threads of the nut and the screw, leaving the linear stage free to be rapidly positioned, and then, re-connecting the threads of the nut and the screw to resume the linear stage high resolution motion.

SUMMARY OF THE INVENTION

The present invention relates to a linear stage having a screw-nut assembly which comprises a nut-housing, a nut and a screw. The nut is connected to one plate of the stage through the nut-housing. The internal thread of the nut mates with the external thread of the screw, which is attached to the other plate of the stage. In this configuration, a rotation of the screw results in a rectilinear motion, and said motion has a resolution given by the thread pitch of the screw and the nut, and a travel limited by the length of the screw. The nut in the screw-nut assembly has a partial thread and a contiguous round excision; and said nut is held in the nut-housing so it pivots perpendicular to the axis of the screw. In addition, said nut is radial and axial preloaded with respect to the screw, to eliminate backlash.

The internal thread of the nut and the external thread of the screw are disconnected by manually overcoming the radial preload on the nut, and the stage can be rapidly repositioned by the operator. By releasing the nut, the screw and nut threads connect and the stage can then be moved by turning the screw.

A plurality of linear stages concatenated with one another to form a multi-axis positioning device. Said multi-axis positioning device having linear stages with angle adjustable bases, micrometer resolution and rapid displacement via a quick disconnect nut mechanism as described in the present invention.

DETAILED DESCRIPTION OF THE INVENTION

Figure 1:
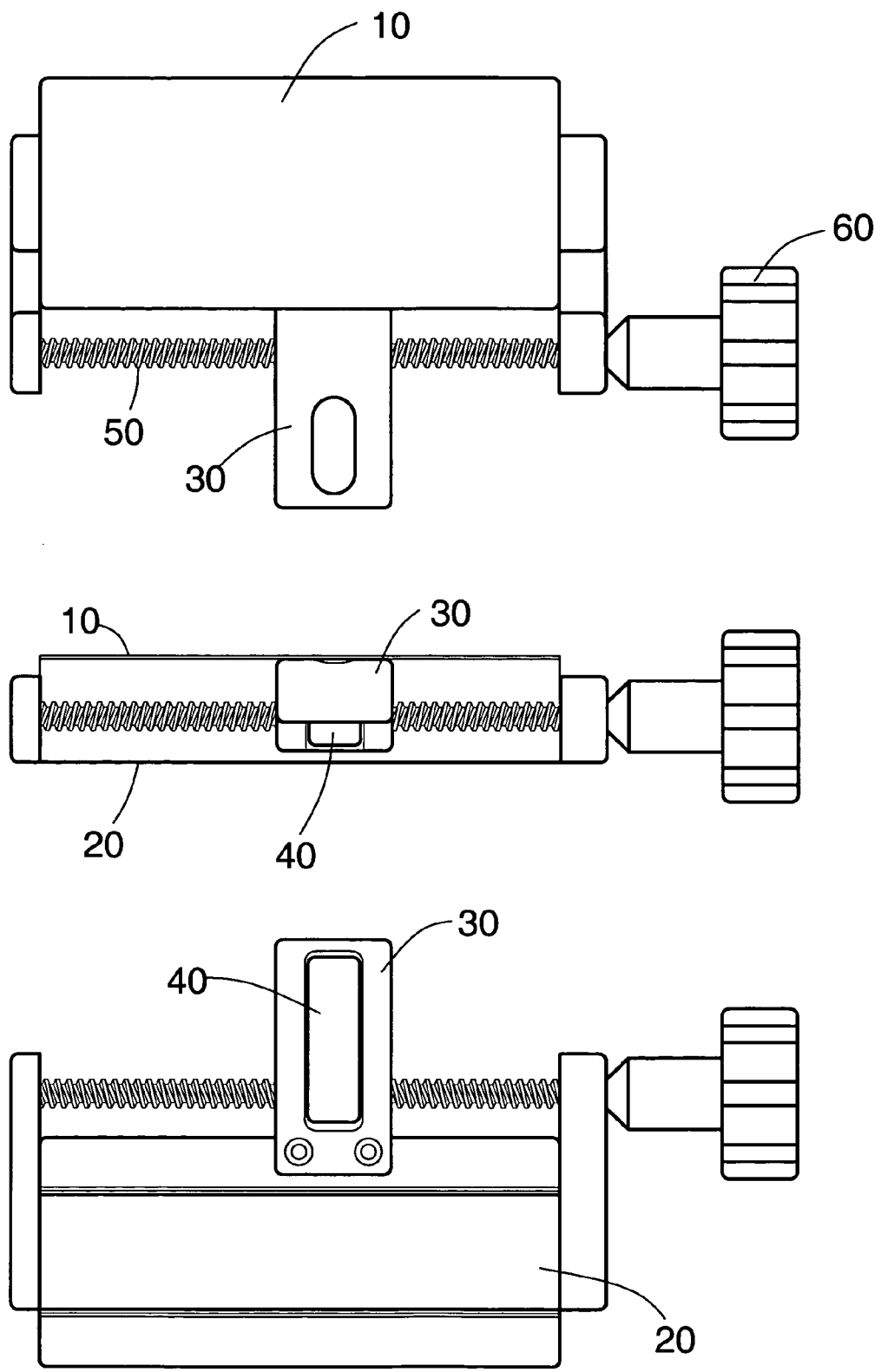
FIG. 1 is a top view, side view and bottom view of a linear stage with a quick-disconnect, anti-backlash screw-nut assembly as described in the present invention.

The present invention relates to a linear stage having an anti-backlash screw-nut assembly which comprises a nut-housing 30, a nut 40 and a screw 50. The nut is connected to one plate 10 of the stage through the nut-housing 30. The internal thread of the nut 40 mates with the external thread of the screw 50, which is attached to the other plate of the stage 20. In this configuration, a rotation of the screw results in a rectilinear motion. In the case of the linear stage shown in FIG. 1, this is achieved by manually turning the knob 60, which is connected to the screw 50.

Figure 2:
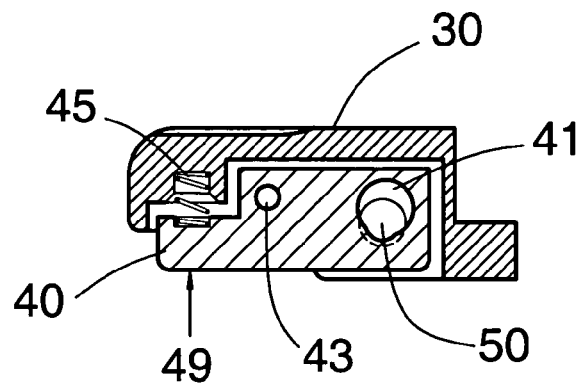
FIG. 2 is a side sectional view of the screw-nut assembly shown in FIG. 1, depicting the pivoting point and radial preload on the nut, which enables the connection between the inner thread of the nut and the outer thread of the screw.
Figure 3:
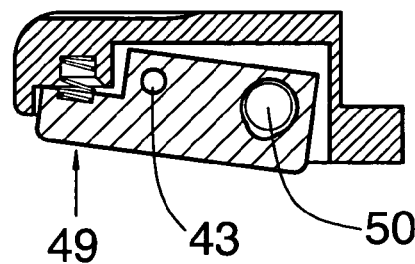
FIG. 3 is a side sectional view of the screw-nut assembly when a force opposite to the radial preload is applied, which disconnects the inner thread of the nut and the outer thread of the screw.
Figure 4:
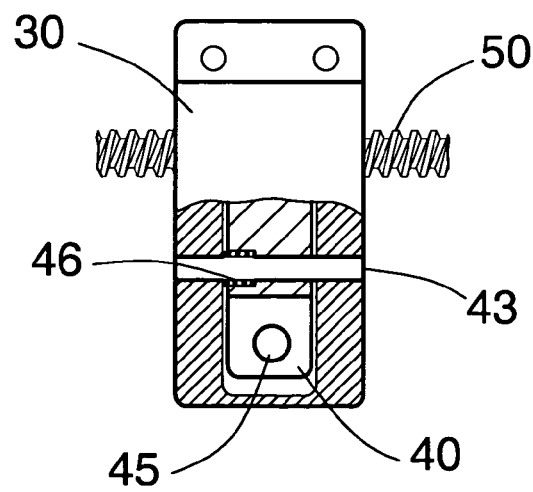
FIG. 4 is a top sectional view of the screw-nut assembly shown in FIG. 1, to depict the axial preload on the nut.

As shown in FIGS. 2-4, the nut 40 is held in the nut-housing 30, such as said nut 40 pivots 43 perpendicular to the axis of the screw 50; and said nut 40 having an internal thread and a contiguous round excision, resulting in the partial removal of the internal thread 41. Said nut 40 having the center point of the imaginary circumference projected by its partial internal thread in the same geometric plane than the pivoting point. In addition, by inserting compression springs between said nut 40 and nut-housing 30, said nut is radial 45 and axial 46 preloaded with respect to the screw 50. The radial 45 preload allows the connection of the inner thread of the nut 40 and the outer thread of the screw 50. Also, the radial 45 preload on said nut 40 compensates for the non-linearity and out of roundness of the screw 50 and eliminates all possible play between the internal thread of the nut and the external thread of the screw. In addition, the axial 46 preload on said nut 40 eliminates all possible play between the nut and the nut housing. If said nut 40 is fitted in the nut-housing 30 such as there is no permissible axial play, but the pivoting motion of said nut 40 is still allowed, only radial preloading 45 of said nut is required to connect the nut 40 and the screw 50 and to eliminate backlash.

The internal thread of the nut 40 and the external thread of the screw 50 are disconnected by overcoming the radial 45 preload on the nut 40 (see 49 in FIGS. 2-3). Given that the cutout adjacent to the partial thread of said nut 40 is made bigger than the diameter of the screw, said nut 40 is free to move along the axis of the screw (see 41 FIG. 3), and the stage can be rapidly repositioned by the operator. By releasing said nut 40, the screw and nut threads connect and the stage linear motion is then resumed by turning the knob 60 connected to the screw 50.

Figure 5:
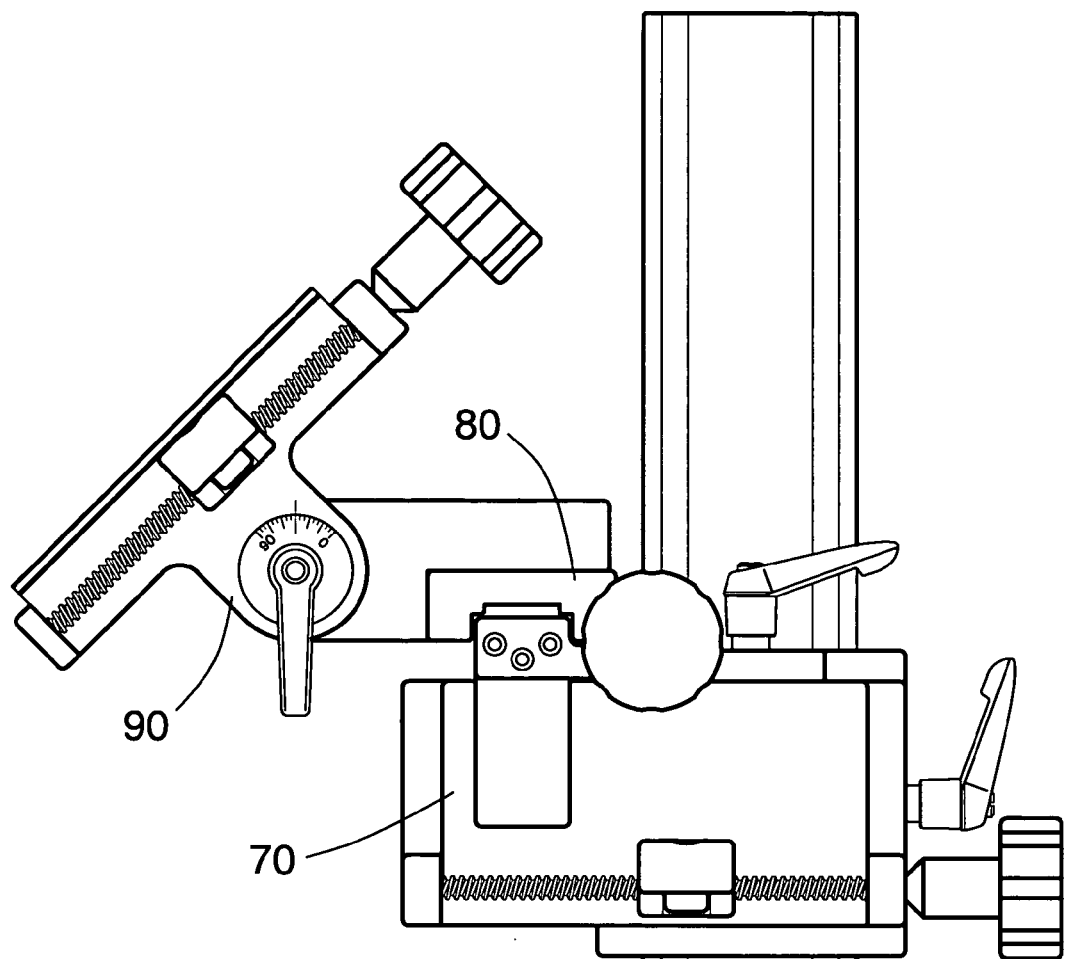
FIG. 5 is a view of a multi-axis positioning device, composed of a plurality of linear stages as described in the present invention.

FIG. 5 shows a plurality of linear stages 70, 80, 90 concatenated with one another to form a multi-axis positioning device. Said multi-axis positioning device having linear stages with angle adjustable bases 90, micrometer resolution and rapid displacement via a quick disconnect anti-backlash nut mechanism as described in the present invention. For simplicity, the description of the invention is limited to a rectilinear motion. However, the invention is extended to any translational movement along the screw which is generated by the rotation of the screw relative to a moving part coupled to said screw via a nut. Said screw rotation being manual or motor driven. Also, the invention is extended to full thread nuts, in which radial and axial preloading in addition to pivoting, are used to effectively eliminate backlash.

While this invention has been particularly shown and described with references to preferred embodiments thereof, it will be understood by those knowledgeable in the art that several changes in form and details may be made therein without departing from the scope of the invention.

I claim:

1. A device comprising:
   a set of opposite sliding members connected by a nut and threaded rod assembly, wherein the rotational motion of the threaded rod translates into a change in the relative position of said sliding members;
   said nut and threaded rod assembly comprising:
   a threaded rod connected to one of said sliding members,
   a housing connected to the other of said sliding members, and
   a pivotable nut connected to said housing, such that said nut pivoting plane being orthogonal to the longitudinal axial plane of said threaded rod;
   said nut having an internal thread and a contiguous round excision, resulting in the partial removal of the internal thread;
   said nut having the center point of the imaginary circle projected by the partial internal thread and the pivoting point in the same geometric plane;
   said nut having the diameter of said contiguous round excision larger than the diameter of said threaded rod, such that the pivoting motion of said nut disengaging the partial inner thread of said nut and the outer thread of said threaded rod, and enabling said sliding members of said device changing relative position without the rotational motion of said threaded rod;
   said nut having radial preload, said radial preload realized by means of connecting a compression spring member between said nut and said housing;
   said compression spring exerting a force on said nut, and said force on said nut being tangential to the arc described by the pivoting motion of said nut, and said radial preload engaging the threads of said nut and of said threaded rod with no mechanical play; and
   said nut connected to said housing with no axial mechanical play between said nut and said housing; and said axial mechanical play referenced to the longitudinal axis of said threaded rod.

2. The device of claim 1, wherein said nut connected to said housing with no axial mechanical play, having axial preload;
   said axial preload realized by means of connecting a compression spring member between said nut and said housing;
   said compression spring exerting a force on said nut, and said force on said nut being parallel to the longitudinal axis of said threaded rod, and said force on said nut eliminating the axial mechanical play between said nut and said housing.

3. The device of claim 1, wherein said nut fitted in said housing with no permissible axial mechanical play between said nut and said housing.

4. The device of claim 1, wherein there is provided a plurality of said device concatenated with one another forming a multi-axis device.

5. The device of claim 1, wherein there is provided means for pivoting said nut overcoming said radial preload, and enabling said sliding members of said device changing relative position without requiring the rotational motion of said threaded rod.

6. A device comprising:
   a nut and threaded rod assembly connecting a set of opposite sliding members, wherein the rotational motion of the threaded rod translates into a change in the relative position of said sliding members;
   said nut and threaded rod assembly comprising:
   a threaded rod connected to one of said sliding members,
   a housing connected to the other of said sliding members,
   a pivotable nut having full thread and connected to said housing, such that said nut pivoting plane being orthogonal to the longitudinal axial plane of said threaded rod, and
   a compression spring member connected between said nut and said housing, and said compression spring action radial preloading said nut;
   said radial preload tangential to the arc described by the pivoting motion of said nut, such that the engaging threads of said nut and of said threaded rod having no mechanical play; and
   said nut connected to said housing with no axial mechanical play between said nut and said housing; and said axial mechanical play referenced to the longitudinal axis of said threaded rod.

7. The device of claim 6, wherein said nut connected to said housing with no axial mechanical play, having axial preload;
   said axial preload realized by means of connecting a compression spring member between said nut and said housing; said compression spring exerting a force on said nut parallel to the longitudinal axis of said threaded rod, and said force on said nut eliminating the axial mechanical play between said nut and said housing.

8. The device of claim 6, wherein said nut fitted in said housing with no axial mechanical play between said nut and said housing.

9. The device of claim 6, wherein there is provided a plurality of said device concatenated with one another forming a multi-axis device.

* * * * *